J. R. DONNELLY.
PLUMBER'S FERRULE.
APPLICATION FILED JULY 22, 1907.
913,366.
Patented Feb. 23, 1909.
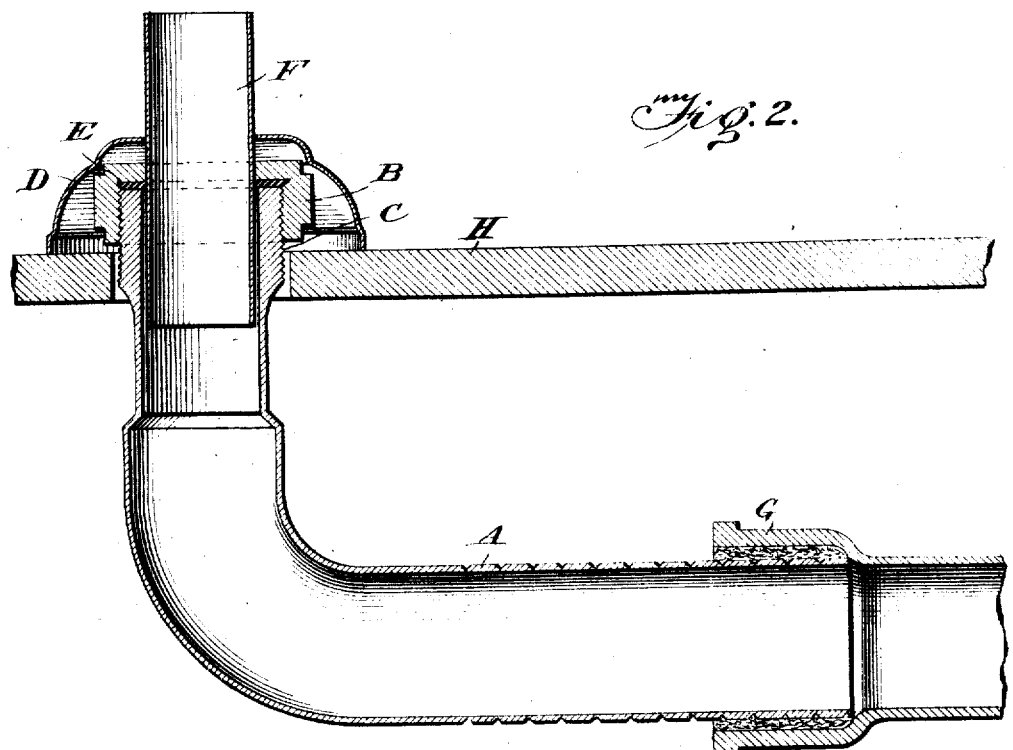
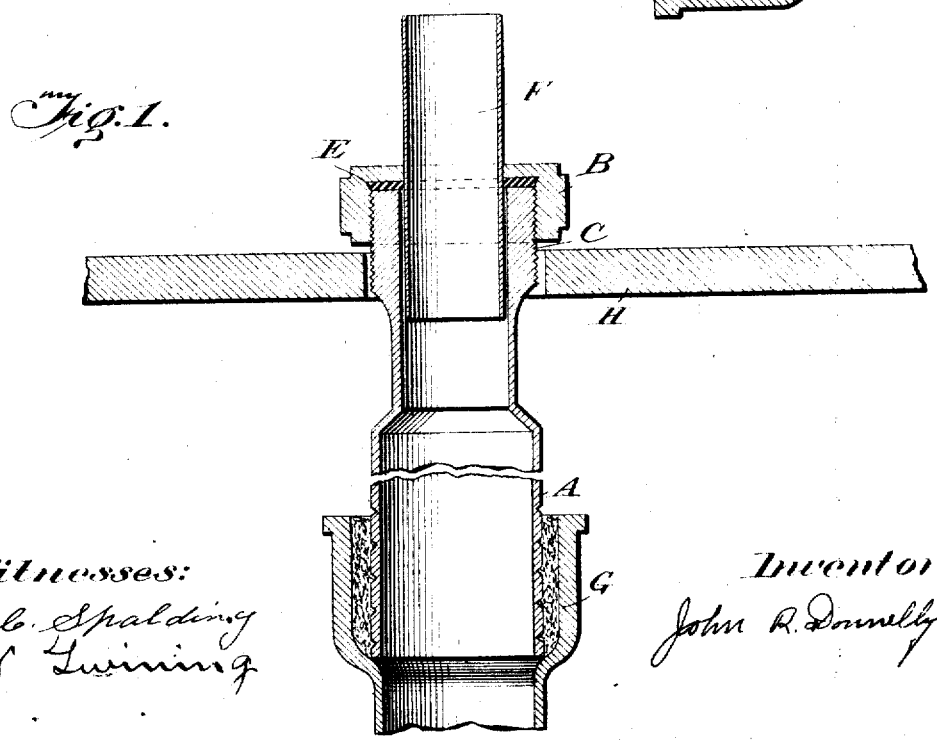
Witnesses:
O. C. Spalding
W. Twining
Inventor:
John R. Donnelly

UNITED STATES PATENT OFFICE.

JOHN RICHARD DONNELLY, OF AUSTIN, TEXAS.

PLUMBER'S FERRULE.

No. 913,366.

Specification of Letters Patent.

Patented Feb. 23, 1909.

Application filed July 22, 1907. Serial No. 385,090.

*To all whom it may concern:*

Be it known that I, JOHN R. DONNELLY, a citizen of the United States, residing at Austin, in the county of Travis and State of Texas, have invented certain new and useful improvements in plumbers' ferrules for making connections between the waste-pipe of plumbing-fixtures, having two-inch or smaller waste-pipe, and a cast-iron soil-pipe, whereby the use of lead or brass ferrules is dispensed with; and I hereby declare the following to be a full, clear, and exact description of my invention, such as will enable others skilled in the art to which it appertains to make and use the same.

Figure 1 in the accompanying drawings is a longitudinal section showing one form of the improved device applied. Fig. 2 represents a similar view showing the ferrule bent to form an elbow.

In Fig. 1, a straight ferrule A is shown arranged between the fixture waste pipe F and a cast iron soil pipe G.

In Fig. 2 is shown a bent, or part vertical and part horizontal ferrule A arranged between the waste pipe F and the cast iron soil pipe G, the bend being shown at right angles, but it may be made at any angle, form, shape, or trap, to suit the nature of said connection.

The parts shown in the drawings which are in ordinary use and form no part of my invention are the fitting D comprising a loose cap or escutcheon disposed over nut B, the waste pipe F extending from a fixture (not shown) the hub G of the soil pipe into which my improved ferrule A is calked and floor or wall H, upon which the plumbing fixtures to be connected are set.

In the connections now in use made between waste pipes of fixtures and cast iron soil pipes, lead or lead and brass ferrules are used and they must be soldered with an iron or wiped together with solder. I dispense entirely with such form of connection and provide a more economical, neater and more substantial and effective device.

My improved connection or ferrule A is made preferably of cast iron and comprises a body portion provided at one end with a reduced extension, the outer end C of the extension being of increased thickness and exteriorly screw-threaded to receive a nut B and a fixture waste pipe F. The other end of the ferrule A has notches or depressions formed in its outer face here shown as grooves a' arranged around its circumference at intervals to adapt it to be broken off at the desired point to fit different sized spaces and is made to calk into the hub of the cast iron soil pipe G.

In the use of this fitting the scored or notched end is inserted in the hub G of the soil pipe with its outer face spaced from the inner face of said hub, and the space so formed is filled with a solidifying metal material such as molten lead, which flows into the notches in the ferrule and on hardening securely unites said ferrule to the hub, leaving the threaded end and nut B above the floor line. It will thus be seen that the grooves or notches perform the double function of means for securely uniting the ferrule to the soil pipe and to assist in breaking or cutting the ferrule off at the proper point to adapt it to fit spaces of different sizes. After the floor is laid and the fixtures are to be set in place, the nut B is removed and a gasket E and nut B are slipped onto the waste pipe F, which is then inserted into the threaded end of the extension of the ferrule A. As the outer end of the extension is made of increased thickness, a seat of sufficient width is provided for the gasket. The nut B is then screwed down on threads C forcing the gasket E to a seat and forming a perfectly tight connection. To disconnect the parts, it is only necessary to unscrew the nut B, when the fixture pipes may be entirely removed for cleaning or other purposes. For testing the pipes for leaks before the fixtures are set, a solid or blind washer may be applied under the nut B forming a perfect seal against testing pressure, and can be quickly removed without injury to connections.

Having thus described my invention, what I claim is—

In combination with a plumber's ferrule comprising a body portion formed in its outer surface with a series of deep spaced circumferential breaking grooves and at one end with a reduced extension provided at its outer end with an exteriorly threaded enlargement, a waste pipe extending into the extension of the ferrule, a gasket fitted to the waste pipe and seated on the threaded enlargement of the extension, a nut having an in-turned flange screwing upon the threaded enlargement of the extension upon said gasket, a soil pipe having a hub of greater diameter than and to receive the grooved end of the ferrule, solidifying material in the hub around the grooved end of the ferrule, and a removable protective cap fitted to the waste pipe and inclosing the threaded enlargement of the extension of the ferrule, the grooves in the body of the ferrule providing a means whereby the length of the ferrule may be varied by breaking it off at any one of its grooved points and also serving to receive a portion of the solidifying material to insure a tight joint between the hub of the soil pipe and the grooved portion of the ferrule body.

JOHN RICHARD DONNELLY.

Witnesses:
Z. T. FULMORE, Jr.,
W. TWINING.